United States Patent [19]

Morris

[11] 4,108,477
[45] Aug. 22, 1978

[54] WASTE DRAIN CONNECTION FOR PLUMBING FIXTURES
[75] Inventor: Earl L. Morris, Whittier, Calif.
[73] Assignee: Acorn Engineering Co., Industry, Calif.
[21] Appl. No.: 747,522
[22] Filed: Dec. 6, 1976
[51] Int. Cl.² .................................. F16L 55/00
[52] U.S. Cl. .................... 285/58; 4/252 R; 285/64; 285/158
[58] Field of Search .............. 285/64, 56, 57, 58, 285/59, 158, 159; 4/252 R

[56] References Cited
U.S. PATENT DOCUMENTS

| 1,217,965 | 3/1917 | Lloyd | 285/58 X |
| 1,335,056 | 3/1920 | Hinsdale | 285/58 X |
| 1,650,057 | 11/1927 | Wernle | 285/158 X |
| 2,810,918 | 10/1957 | Baker et al. | 4/252 |

FOREIGN PATENT DOCUMENTS

| 560,444 | 4/1944 | United Kingdom | 4/252 |
| 9,542 of | 1912 | United Kingdom | 285/158 |

*Primary Examiner*—Dave W. Arola
*Attorney, Agent, or Firm*—Ben E. Lofstedt

[57] ABSTRACT

A waste drain connection for independently-supported plumbing fixtures including a pipe with two open ends and a pair or radially-extending arms having open portions therethrough secured to the outside of the pipe intermediate the open ends thereof. A receptacle mounted to the plumbing fixture drain outlet is adapted to receive a fluid sealing gasket. Mounted to the plumbing fixture about the receptacle are two, oppositely-disposed threaded studs. The studs are arranged to be alignable with the pair of open portions in the arms of the pipe. A pair of nuts threadably engaged over the ends of the studs following mating thereof with the open portioned arms to move one of the ends of the pipe into sealing engagement with the gasket. A standard no-hub connection is used to couple the other end of the pipe to the plumbing drain.

3 Claims, 1 Drawing Figure

WASTE DRAIN CONNECTION FOR PLUMBING FIXTURES

BACKGROUND OF THE INVENTION

1. Field of the Invention

The present invention lies in the field of waste drain connections for independently-supported plumbing fixtures.

2. Description of the Prior Art

Waste drain connections for plumbing fixtures in the prior art are generally installable and removable from the exposed plumbing fixture or user side. However, it is only with great expense and difficulty that such waste drain connections are rendered vandal-proof. To be vandal-proof, the connection cannot be removable or tampered with from the user-exposed side of the plumbing fixture.

Such a feature as being vandal-proof is a highly desirable commercial feature, especially when applied to such plumbing fixtures as are installed and used in public institutions, such as jails or prisons.

Additionally, such waste drain connections are frequently constructed as a part of a carrier and adapter assembly, wherein the waste connection provides a carrier for structurally supporting a plumbing fixture, and to adapt the drain outlet of the plumbing fixture to the soil stack which receives the waste from the waste outlet of the plumbing fixture. In such a carrier and adapter assembly, the waste connection is utilized as an essential element for structurally supporting the plumbing fixture.

Examples which serve to illustrate these characteristics of the prior art are illustrated and clearly disclosed in U.S. Pat. Nos.: 2,795,798, 3,020,565 and 3,540,065.

In reviewing such examples, it may be readily seen that such assemblies are relatively complex, expensive to construct and require a relatively lengthy period of time to install. Again, such assemblies are installable and removable in a commercially-convenient manner solely from the exposed or user side of the plumbing fixture.

Due to the fact that many of such assemblies in the prior art possess or use threaded studs which parallel the length of the pipe connection in the adapter assemblies and are laterally spaced therefrom, a larger hole must be created in the wall or partition through which the connection must pass.

In addition, the plumbing fixture must generally be removed before such waste connections are accessible for periodic maintenance, adjustment, or replacement.

When such prior art devices are used to mate with and compress a fluid-sealing gasket disposed between the plumbing fixture drain outlet, the compression force and alignment adjustment oftentimes can only be accomplished from the user or exposed side of the plumbing fixture. Such accessibility is undesirable when plumbing fixtures are used in various public or penal institutional facilities.

SUMMARY OF THE INVENTION AND OBJECTS

The present invention relates to a waste connection which connects the drain outlet of a plumbing fixture to the waste inlet of a soil or waste drain pipe.

Fundamentally, the instant invention comprises a vandal-proof waste drain connection for independently-supported plumbing fixtures, such as are supported by a wall or partition, which include, but should not in any way be construed as being solely limited thereto, wall or partition-mounted plumbing fixtures, floor-mounted plumbing fixtures, and plumbing fixtures which are supported by both the floor and wall or partition.

Further, the waste drain connection includes a pipe with two open ends and a pair of oppositely-disposed, radially-extending arms having apertures or open portions therethrough secured to the outside of the pipe intermediate the open ends thereof. A receptacle mounted to the plumbing fixture drain outlet is adapted to receive a fluid sealing gasket. Mounted to the plumbing fixture about the receptacle are two oppositely-disposed threaded studs. The studs are arranged to be alignable with the pair of open portions in the arms of the pipe. A pair of nuts threadably engaged over the ends of the studs following mating thereof with the open portions in the arms to move one of the ends of the pipe into sealing engagement with the gasket. A standard no-hub connection is used to couple the other end of the pipe to the plumbing drain.

One object of the present invention is to provide a waste drain connection for plumbing fixtures which does not serve to support any substantial weight of the plumbing fixture, and, in fact is non-supporting.

Another object of the invention is to provide a relatively simple, inexpensive waste connection between the soil pipe and the waste outlet or drain of a plumbing fixture.

A still further object of the instant invention is to provide a vandal-proof waste drain connection for plumbing fixtures.

Another object of the invention is to provide a waste drain connection for plumbing fixtures which may be installed and totally removed from the pipe chase area behind the plumbing fixture without interfering with or disturbing the plumbing fixture or the structural support for the plumbing fixture.

Another important and primary object of the invention is to provide a means for aligning and adjusting the fluid-sealing relationship between the plumbing fixture drain outlet and the waste drain connection which is accessible only from the pipe chase area and not from the exposed or user side of the plumbing fixture.

A still further object of the invention is to provide a rapid and simple means for adapting the plumbing fixture easily to existing waste-receiving pipes or soil pipe installations.

Another important object of the present invention is to provide a waste connection which requires a substantially smaller aperture in the wall between the plumbing fixture and the waste receiving pipe or soil pipe inlet than waste connections in the prior art.

This invention and its objects and features will be better and more clearly understood from the following description and explanation, when read in connection with the accompanying drawing, in which

DESCRIPTION OF THE PREFERRED EMBODIMENT

Figure 1:
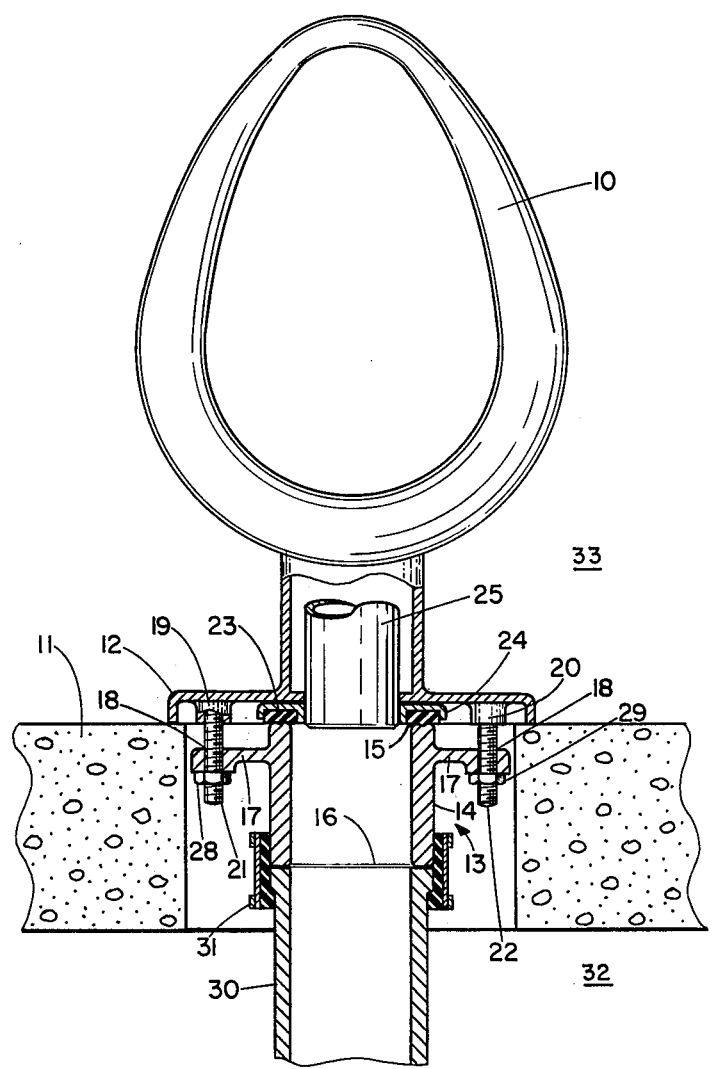
FIG. 1 is a plan view of the waste connection of the present invention, shown partially in section, connected between a wall-hung toilet fixture and a waste-receiving pipe, wherein the waste-receiving pipe is disposed behind the wall in the pipe-chase area.

With reference to the drawing, a plumbing fixture 10, in the form of a toilet bowl, is shown, of the rear outlet type as distinguished from the floor outlet type, so that the plumbing fixture 10 will be discharged through a rear outlet to the sewer system. Such a rear outlet plumbing fixture 10 as shown, is supported by the wall 11 to which the rear of the plumbing fixture 10 mounting flange 12 is abutted and mounted. While this precise means for securing and mounting the plumbing fixture 10 to the wall 11 so that the plumbing fixture 10 is fully supported thereby independently of the plumbing piping is not shown in the Drawing, such means are well-known in the prior art.

As depicted in FIG. 1, the waste connection of the present invention, generally identified at 13, comprises a pipe 14, having two open ends 15, 16, and a pair of oppositely-disposed, radially-extending arms 17 having apertures 18 therethrough and formed as an integral part of the pipe 14 and disposed intermediate the ends 15, 16 thereof.

The area into which the plumbing fixture 10 projects into so that it can be utilized by persons in need thereof is identified as the user area 33. The area behind the wall is inaccessible to persons occupying the user area 33 because the water piping and other utilies are typically located in this area to prevent unauthorized tampering therewith. This area is called the "pipe chase" area and is identified at 32.

Joined to the rear face of the plumbing fixture mounting flange 12, typically by welding or brazing, are two threaded receptacles 19, 20 for threadably receiving threaded anchoring studs 21, 22.

When the open end 15 is positioned in abutting relationship to a fluid-sealing gasket 23, the gasket 23 being adapted to be received into a gasket-receiving receptacle 24, wherein said receptacle is circumferencially disposed around the waste outlet or drain 25 of the plumbing fixture 10, the rim of the end 15 of the pipe 14 is aligned therewith by means of the apertures 18 in the arms 17, as the apertured sections are passed over the bodies of the threaded studs 21, 22 which are threadably anchored to the threaded receptacles 19, 20.

Following the alignment of the rim of the open end 15 of the pipe 14 with the gasket 23 as described above, nuts 28, 29 are threadably mated to the studs 21, 22. The nuts 28, 29 are subsequently screwed further and further onto said studs 28, 29 until contact is made with the ends of the arms 17. After such contact is made any further tightening of the nuts 28, 29 will force said arms 17 towards the mounting flange 12, thereby forcing the rim of the open end 15 of the pipe 14 against the gasket 29 in a substantially uniformly distributed fashion. Such adjustment is completed when a fluid seal is effected between the rim of the open end 15 of the pipe 14, the gasket 23, and the receptacle 24.

About the second open end 16 of the pipe 14, a no-hub connection 31 is used to adapt the relatively smooth outer body of the pipe 14 to the outer body of the waste-receiving pipe 30. Thereafterwards, by means of a screwdriver or wrench, the connection is tightened to effectuate a fluid seal and coupling between the pipe 14 and the waste-receiving pipe 30.

While the construction above referred is especially suitable for a rear outlet type of toilet bowl, it will be apparent that the same sort of construction is readily applicable to other types of toilet bowls and other forms of plumbing fixtures having waste outlet drains.

It will be obvious to those skilled in the plumbing art that certain changes and modifications can be effectuated to the present invention without departing from the spirit or scope thereof. For example, the apertures 18 herein referred to in each of the arms 17 obviously may be an open portion, such as a slotted portion or V-notch at the extremities of the arms 17, rather than an enclosed hole or aperture. Additionally, it should be noted that it is highly desirable to insure that there is sufficient distance between the arms 17 and the open end 15 of the pipe 14 engageable with the gaskets 23. Consequently, to provide for a total adjustment throughout the depth of the gasket receptacle 24, the distance between the open end 15 of the pipe 14 and the arms 17 must be at least as great as the depth of the gasket receptacle 24. This will ensure complete adjustment of gasket compression throughout the entire depth of the gasket receptacle 24.

While this invention has been shown and described in particular arrangements merely for illustration and explanation, it will be readily apparent that the invention may be widely varied without departing from the scope and spirit of this invention.

We claim:

1. A vandal-proof waste outlet connection providing a removable fluid passageway between the waste drain outlet of a plumbing fixture supported independently from the plumbing pipes coupled to it and a waste-receiving plumbing pipe inlet, said waste drain outlet having a receptacle for receiving a fluid sealing gasket, comprising:

(a) a pipe having a smooth surface and at least two open ends and a pair of oppositely disposed, radially-extending arms having open portions therethrough and arranged on said pipe intermediate said open ends of said pipe, said arms disposed from said open pipe ends a distance at least as great as the depth of said receptacle for receiving a fluid sealing gasket therein;

(b) means for aligning one of said open ends of said pipe with said gasket, said gasket being disposed between said receptacle and the rim of said open pipe end, whereby said gasket extends radially beyond said rim, said alignment means disposed on the opposite side of the mounting wall for said independently supported plumbing fixture in the pipe chase area and thereby being inaccessible from outside of the pipe-chase area;

(c) means for adjustably connecting said arms to said plumbing fixture whereby said arms are movable towards or away from said gasket so that said one of said open ends of said pipe may be coupled in fluid sealing engagement with said gasket and disengaged therefrom as desired, said adjustment means disposed on the opposite side of the mounting wall for said independently supported plumbing fixture in the pipe chase area and thereby being inaccessible from outside of the pipe chase area; and (d) a no-hub connection for coupling said one other open end of said pipe in fluid communication with said waste-receiving pipe, said no-hub connection disposed on the opposite side of the mounting wall for said independently-supported plumbing fixture in the pipe chase area and thereby being inaccessible from outside of the pipe-chase area.

2. The device of claim 1, wherein said means for adjustably connecting said arms to said plumbing fixture whereby said arms are movable towards or away from said gasket so that said one of said open ends of said pipe may be coupled in fluid sealing engagement with said gasket and disengaged therefrom as desired, comprises:
 (a) a pair of externally-threaded studs;
 (b) a pair of apertures in said arms, said open portions being of sufficiently large diameter to permit said open portions to be passed over said studs;
 (c) a pair of threaded anchoring receptacles affixed to the backside of said plumbing fixture, said threaded receptacles adapted to threadably receive said threaded studs after said studs have been located in said open portions; and
 (d) a pair of nuts adapted to be threadably mated to the ends of said studs opposite the ends of said studs which are mounted to said receptacles.

3. A waste outlet connection providing a fluid passageway between the waste drain outlet of a wall-mounted plumbing fixture which is supported independently from the plumbing pipes coupled to it and a waste-receiving plumbing pipe inlet, said waste drain outlet having a receptacle thereabout for receiving a fluid-sealing gasket, which is larger in diameter than said waste drain outlet, comprising:
 (a) a smooth, unthreaded pipe having a pair of oppositely-disposed open ends, one of said open ends having an outer diameter smaller than said gasket, and including a pair of oppositely-disposed, apertured arms extending outwardly therefrom, said arms being arranged intermediate said open pipe ends;
 (b) means for aligning the rim of said open pipe end which is smaller in diameter than said gasket with said gasket;
 (c) means for connecting said arms to said plumbing fixture;
 (d) means for moving said rim into and out of fluid sealing engagement with said gasket;
 (e) means for effecting fluid sealing engagement between said gasket and said receptacle; and
 (f) a no-hub connection for coupling said open pipe end in fluid communication with said waste-receiving pipe.

* * * * *